US009032062B2

(12) United States Patent
Momchilov

(10) Patent No.: US 9,032,062 B2
(45) Date of Patent: May 12, 2015

(54) SHELL INTEGRATION ON A MOBILE DEVICE FOR AN APPLICATION EXECUTING REMOTELY ON A SERVER

(75) Inventor: Georgy Momchilov, Coconut Creek, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 317 days.

(21) Appl. No.: 13/475,413

(22) Filed: May 18, 2012

(65) Prior Publication Data

US 2012/0297041 A1    Nov. 22, 2012

Related U.S. Application Data

(60) Provisional application No. 61/488,612, filed on May 20, 2011, provisional application No. 61/488,593, filed on May 20, 2011.

(51) Int. Cl.
*G06F 15/173* (2006.01)
*G06F 9/44* (2006.01)
*G06F 9/445* (2006.01)

(52) U.S. Cl.
CPC ............ *G06F 9/4443* (2013.01); *G06F 9/4451* (2013.01)

(58) Field of Classification Search
CPC .......... H04L 67/24; H04L 67/22; H04L 67/34
USPC ................................................. 709/223, 203
See application file for complete search history.

(56) References Cited

U.S. PATENT DOCUMENTS

| 7,509,672 | B1 * | 3/2009 | Horwitz et al. ................... 726/8 |
| 7,784,031 | B1 * | 8/2010 | Borg et al. ..................... 717/121 |
| 8,606,889 | B2 * | 12/2013 | Kazan et al. ................... 709/221 |
| 2005/0010873 | A1 * | 1/2005 | Nakamura ..................... 715/744 |
| 2005/0021935 | A1 * | 1/2005 | Schillings et al. ................ 713/1 |
| 2005/0066037 | A1 * | 3/2005 | Song et al. .................... 709/227 |
| 2007/0192322 | A1 * | 8/2007 | Dandekar et al. ................ 707/9 |
| 2008/0005238 | A1 * | 1/2008 | Hall et al. ..................... 709/204 |
| 2008/0126929 | A1  | 5/2008 | Bykov |
| 2009/0199122 | A1 * | 8/2009 | Deutsch et al. ................ 715/771 |
| 2011/0307880 | A1 * | 12/2011 | Hilerio et al. ................. 717/171 |

FOREIGN PATENT DOCUMENTS

WO     2004013782 A1    2/2004

* cited by examiner

*Primary Examiner* — Duyen Doan
(74) *Attorney, Agent, or Firm* — Banner & Witcoff, Ltd.

(57) ABSTRACT

The systems and methods described herein are directed to permit roaming of applications across devices consistently and dynamically. Other aspects include roaming of application idiosyncrasies, data or content specific to each application, user preferences specific to each application or content, such as pinning or unpinning, and user history specific to each application in a consistent and complete fashion across diverse devices to provide seamless integration with the native device user interface. Application idiosyncrasies may include different options supported by the applications, groups of tasks or content, dynamically changing user interface, and tasks or content based on application state or user actions. In another aspect, the systems and methods described herein seamlessly integrate roaming with the user interface of the native device, such as a tablet or a smart phone. The systems and methods described herein make "work shift" in distributed and diverse device environment practical and extremely usable.

20 Claims, 12 Drawing Sheets

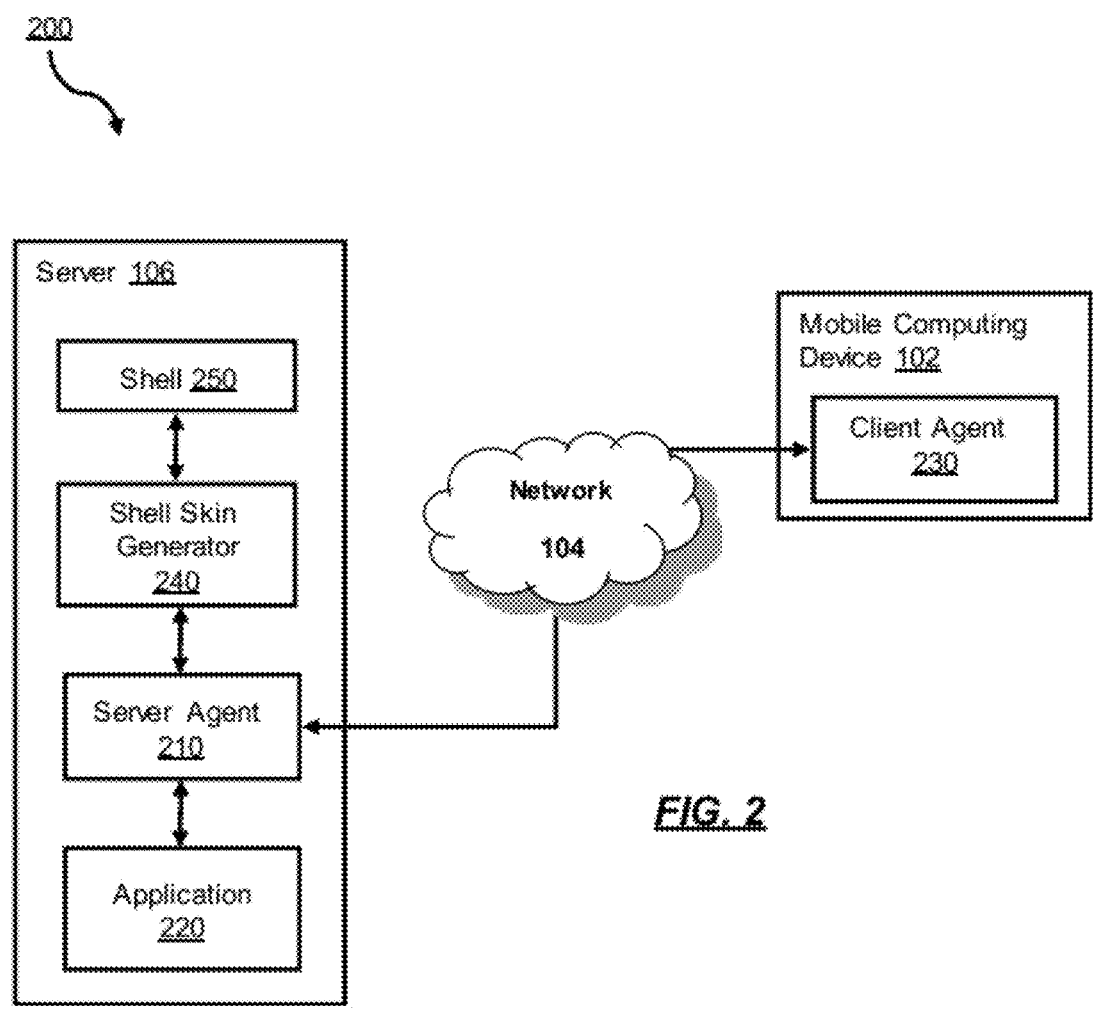

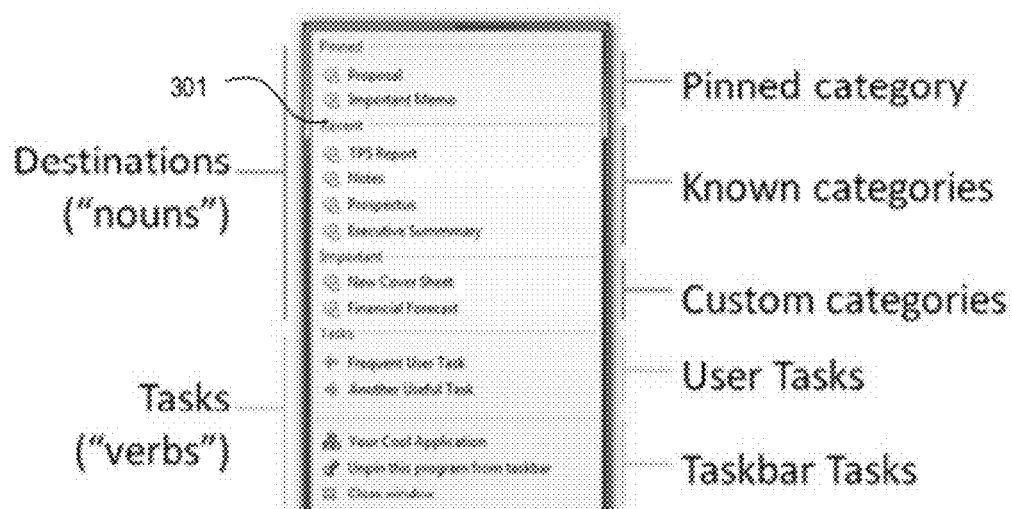
FIG. 3
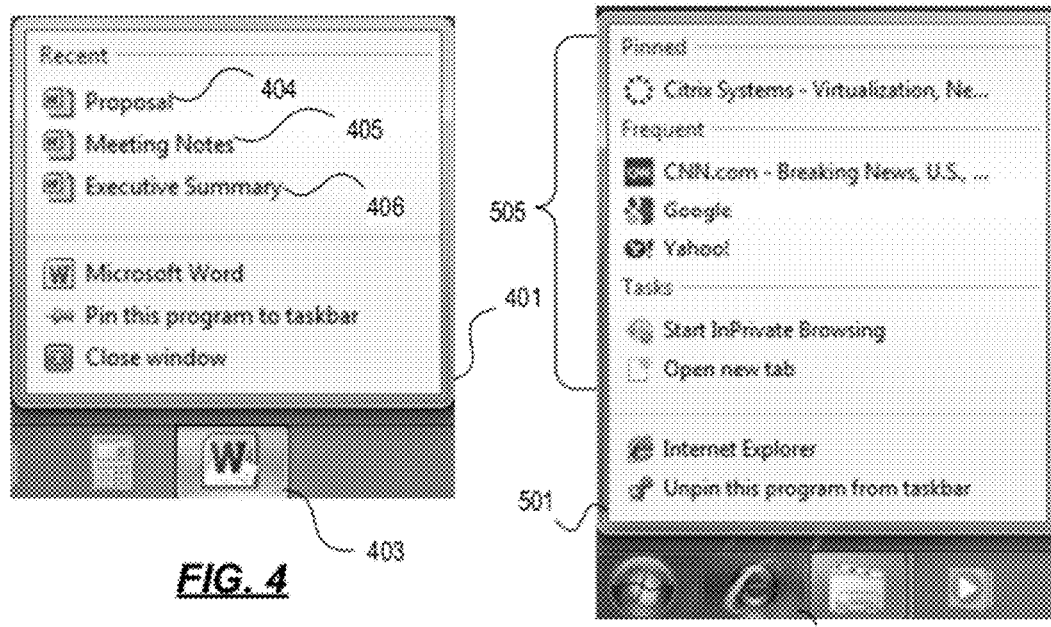
FIG. 4
FIG. 5

SHELL INTEGRATION ON A MOBILE DEVICE FOR AN APPLICATION EXECUTING REMOTELY ON A SERVER

CROSS REFERENCE TO RELATED APPLICATIONS

The present application claims priority to provisional U.S. Application No. 61/488,612, entitled "Systems and Methods for Providing Shell Integration on a Mobile Device for an Application Executing Remotely on a Server," filed May 20, 2011, and provisional U.S. Application No. 61/488,593, entitled "Systems and Methods for Providing Shell Integration for an Application Executing Remotely on a Server," filed May 20, 2011, the contents of both being incorporated herein by reference in their entirety for all purposes.

FIELD

The present disclosure relates generally to displaying on a mobile device applications executing remotely on a server. In particular, the present disclosure is directed to providing shell integration on a mobile device for an application executing remotely on a server.

BACKGROUND

Through the advancements in computing and networking capabilities, companies and users are increasingly using mobile computing devices to execute applications remotely. However, in many instances, the use of remotely executed applications on mobile devices may provide a cumbersome user experience, especially in view of some limitations of mobile computing devices.

Currently there are tools to roam applications across devices and Operating System platforms. There are also tools for data synchronization as well as synchronizing user preferences across devices, such as Microsoft Roaming Profiles. However, these solutions are disjoint and may not be supported by all devices or OS platforms.

SUMMARY

In light of the foregoing background, the following presents a simplified summary of the present disclosure in order to provide a basic understanding of some aspects described herein. This summary is not an extensive overview, and it is not intended to identify key or critical elements or to delineate the scope of the claims. The following summary merely presents various described aspects in a simplified form as a prelude to the more detailed description provided below.

Mobile devices are rapidly penetrating not just the consumer space but also the enterprise world. User expectations are high: devices need to be personal, friendly, and interactive. Information needs to be quickly accessible. Users following the "work shift" mentality expect to be able to do their work with the same ease as they roam from device to device: desktop, laptop, tablet or phone. Today, while there are some solutions to roam applications, synchronize data or user preferences across devices, these solutions are often disjoint and lack complete support. The hosted application experience is particularly cumbersome on mobile devices.

With the systems and methods described herein, for example and without any limitations, a banker may edit a document on his desktop computer. Later he visits a web site and pins it so it can be launched quickly next time. Then the banker roams into a meeting room with his IPAD (or other tablet computing device), and enumerates the applications. Using a designated gesture such as press-and-hold, double-tap, or two-finger swipe, the banker opens a direct view of the Recent documents used by MS Word, including the one the banker just edited on the desktop computer, and is able to open the most recent document directly. Similarly, the user can get a direct view of the web browser's custom tasks, URL history and pinned web sites and is able to open them directly. While on the tablet computing device, the banker can open some new documents and web sites too. Then the user leaves the office for home and on the way uses their Android phone to get to the hosted applications and is able to quickly launch the most recent document they just edited on the tablet computing device.

The systems and methods described herein are directed to permit roaming of applications across devices consistently and dynamically. Other aspects include roaming of application idiosyncrasies, data or content specific to each application, user preferences specific to each application or content, such as pinning or unpinning, and user history specific to each application in a consistent and complete fashion across diverse devices to provide seamless integration with the native device user interface. Application idiosyncrasies may include different options supported by the applications, groups of tasks or content, dynamically changing user interface, and tasks or content based on application state or user actions. In another aspect, the systems and methods described herein seamlessly integrate roaming with the user interface of the native device, such as a tablet or a smart phone. In some embodiments, the local device user interface is used to deliver a seamless and intuitive end user experience. Additionally, using in-session user interface with Shell skins consistent with the native client user interface may provide best leverage across multiple and rapidly emerging new devices. The systems and methods described herein make "work shift" in distributed and diverse device environments practical and extremely usable.

The details of various embodiments of the methods and systems described herein are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2 illustrates a block diagram of a system for providing shell integration on mobile devices for applications executing remotely on a server according to one or more aspects described herein;

FIG. 3 illustrates a screenshot of a customized destination list according to one or more aspects described herein;

FIG. 4 illustrates a screenshot of a Destination List for a word processor according to one or more aspects described herein;

FIG. 5 illustrates a screenshot of a Destination List for a web browser according to one or more aspects described herein;

Figure 1A:
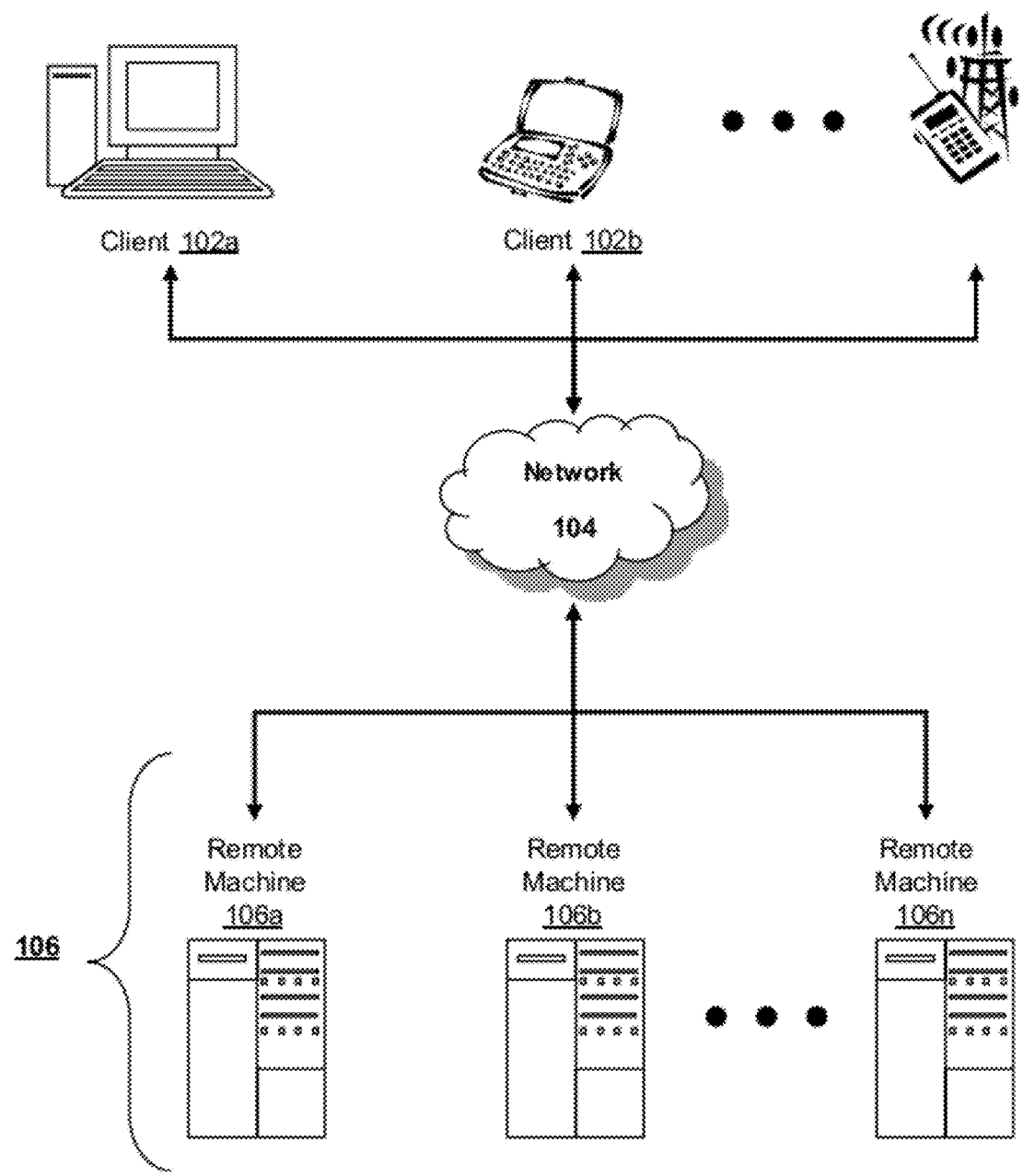
FIG. 1A illustrates embodiments of network environments that provide remote access to computing devices that can execute application programs according to one or more aspects described herein.

The features and advantages of the methods and systems described herein will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

For purposes of reading the description of the various embodiments below, the following descriptions of the sections of the specification and their respective contents may be helpful:

Section A describes a network environment and computing environment which may be useful for practicing one or more embodiments described herein;

Section B describes embodiments of systems for providing shell integration on a mobile device for applications executing remotely on a server; and Section C describes embodiments of methods for providing shell integration on a mobile device for applications executing remotely on a server.

Various aspects of embodiments may be combined or used separately. Each described embodiment is illustrative in nature, and not intended to be limiting unless explicitly so stated.

Section A: Network and Computing Environment

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1A illustrates one embodiment of a computing environment 101 that includes one or more client machines 102A-102N (generally referred to herein as "client machine(s) 102") that are in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can manage client/server connections, and in some cases can load balance client connections amongst a plurality of backend servers.

The client machine(s) 102 can, in some embodiments, be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. In some embodiments, the virtual machine 102C can be managed by a hypervisor such as the Xen hypervisor, developed sold by Citrix Systems, Inc., Hyper-V, developed and sold by Microsoft Corp., ESX, developed and sold by EMC, or any other hypervisor.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the XENAPP or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS;

EV-DO; LTE; or any other protocol able to transmit data among mobile devices like 802.11, Bluetooth, and Near Field Communication.

Figure 1B:
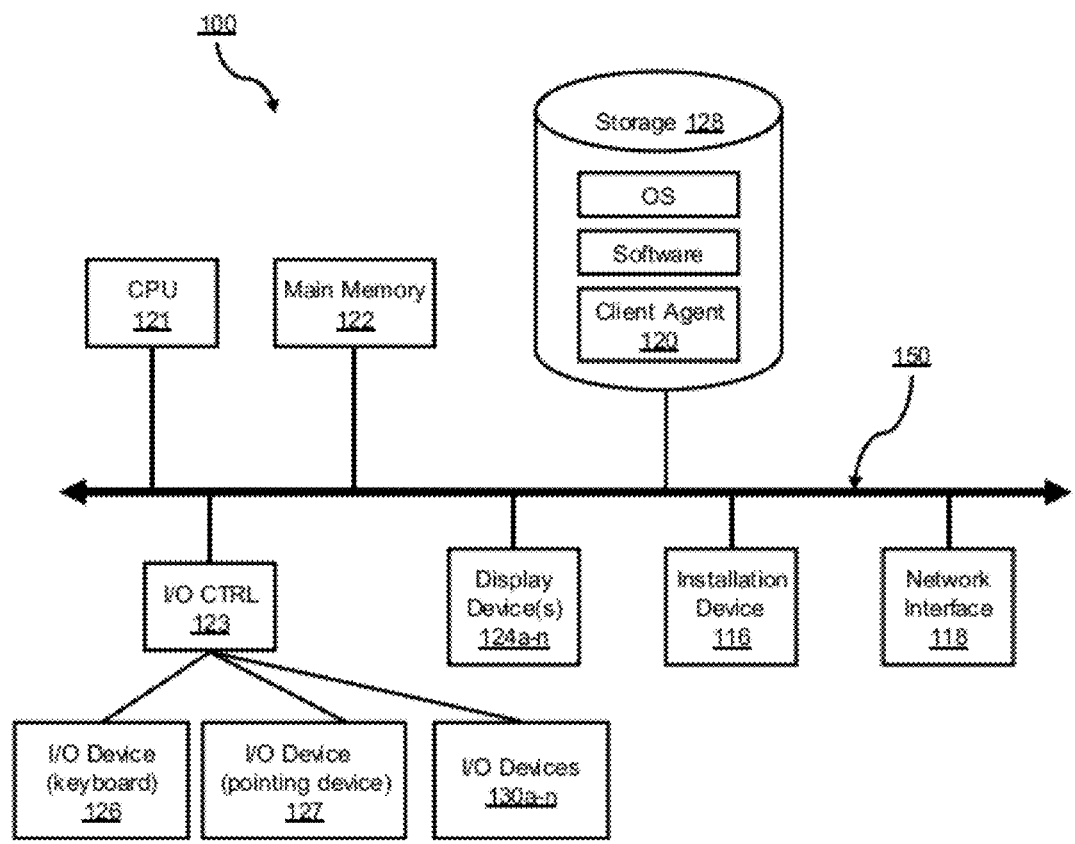
FIG. 1B and FIG. 1C are block diagrams that depict embodiments of computing devices according to one or more aspects described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
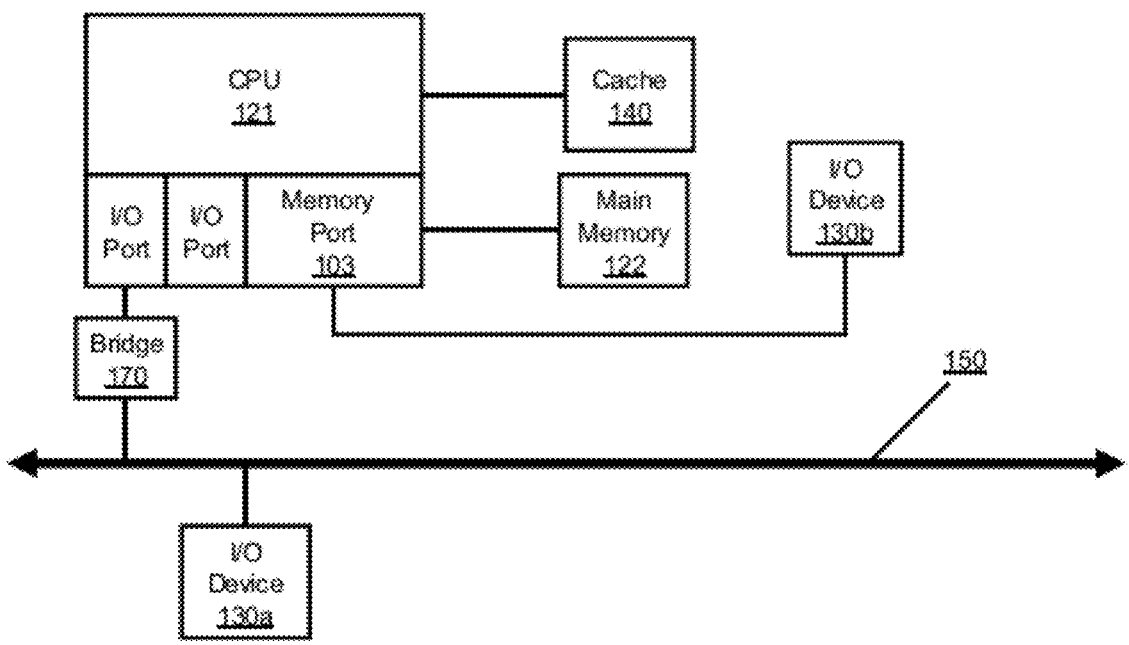

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics-processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; an AGP bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); Memristor based memory; or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, a USB device, Secure Digital card, NetBoot or iPXE firmware, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 100 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 100 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a Motorola RAZR or Motorola ROKR line of combination digital audio players and mobile phones. In another of these embodiments, the computing device 100 is an iPhone smartphone, manufactured by Apple Computer of Cupertino, Calif.

FIGS. 1A-1C are illustrative in nature, and the specific identification of one or more hardware and/or software vendors, devices, services, and other examples are non-limiting. As newer versions of each respective service or device is developed, such new version may also or instead be used, as well as other new services and devices not listed herein.

Section B: Systems for Providing Shell Integration on a Mobile Device for an Application Executing Remotely on a Server Referring to FIG. 2, a block diagram illustrating an illustrative system 200 for providing shell integration on a mobile device for an application executing remotely on a server is shown and described. In brief overview, the system 200 includes a server 106. A server agent 210 executing on the server 106 communicates with a hosted application 220 executing on the server 106. In some embodiments, the hosted application 220 executes within a newly created user session. In some embodiments, the hosted application 220 executes within an existing user session. The server agent 210 communicates with a shell skin generator 240. The server agent 210 communicates with the client agent 230 over a network 104. In some embodiments, the shell skin generator 240 communicates with the client agent 230 over a network 104. In some embodiments, the shell skin generator 240 communicates with the shell 250 of the operating system of the user session executing on the server 106. In some embodiments, the shell skin generator 240 communicates with the shell 250 of the operating system of the server 106. In some embodiments, the server agent 210 communicates with the client agent 230 over a remote presentation layer protocol, such as those described herein. The client agent 230 executes on a mobile computing device 102. In some embodiments, a shell 250 executing on a server 106 provides a display of user interface elements in a desktop environment. This shell 250 may be referred to variously as a finder, a graphical user interface (GUI), a window or X-windows interface, or any other similar term. In some embodiments, the shell 250 displays graphical data associated with the remote application 220 in accordance with the attribute data associated with the application 220.

Still referring to FIG. 2, and in greater detail, the client agent 230 executes on the mobile computing device 102. Although referred to as a client agent, in some embodiments, client agent 230 may be referred to as a receiver, local client, local client process, local client agent, or any other similar term. In one embodiment, the mobile computing device is any type of smart phone or tablet. In another embodiment, the mobile computing device is a mobile device 102, connecting to a server 106 to access one or more resources available to a user of the mobile computing device 102. In still another embodiment, the client agent 230 is part of a presentation layer protocol agent. In another embodiment, the client agent 230 is in communication with a presentation layer protocol agent. In various embodiments, the client agent may comprise software, hardware or any combination of hardware and software.

The server agent 210 executes on the remote computing device 106. As with the client agent 230, in some embodiments, the server agent may be referred to as a remote agent, a remote client, a remote process, a server process, or any other similar term. In one embodiment, the remote computing device is a computing device as described in connection FIGS. 1A-1C. In another embodiment, the server agent 210 is part of a presentation layer protocol agent. In still another embodiment, the server agent 210 is in communication with a presentation layer protocol agent. In various embodiments, the server agent may comprise software, hardware or any combination of hardware and software.

The shell skin generator 240 executes on the remote computing device 106. As with the client agent 230 and the server agent 210, in some embodiments, the shell skin generator 240 may be referred to as a shell agent, a shell skin engine, a shell engine, a skin engine, or any other similar term. In one embodiment, the remote computing device is a computing device as described in connection FIGS. 1A-1C. In another embodiment, the shell skin generator 240 is part of a presentation layer protocol agent. In still another embodiment, the shell skin generator 240 is in communication with a presentation layer protocol agent. In some embodiment, the shell skin generator 240 may comprise software, hardware or any combination of hardware and software.

In one embodiment, the shell 250 is software providing a user interface to the user of a computing device. In one embodiment, a shell 250 may be supplemented or replaced with a third-party shell. In MICROSOFT WINDOWS, the default shell is EXPLORER, which determines the configuration of the desktop (e.g., the task bar, notification area, start menu, etc.). Although referred to as a shell, as discussed above, the shell may also be referred to as a GUI, a finder, an explorer, a windows interface, or any other similar term.

In some embodiments, the client agent 230 includes a receiver (e.g., a virtual machine receiver) for receiving, from the server agent 210, data associated with a desktop environment generated on the remote machine 106. In one of these embodiments, for example, the client agent 230 includes a receiver—which may be provided as, by way of example, a dynamically linked library (.dll) component—that receives window creation and window process data from the server agent 210 for use in displaying a local version of a window generated on the remote machine 106. In some embodiments, the client agent 230 may receive data, such as output data and window attribute data over one or more connections. In one embodiment, one or more connections may be multiplexed into one or more virtual channels. Such multiplexing may allow for different virtual channels to have different bandwidth limits or different priorities, while still being part of a single transport layer connection. This may reduce the transport layer overhead required and provide for SSL or VPN tunnel capability, while still allowing per-channel compression, buffering, and management of communication priority between the shell skin generator 240 and the client agent 230, or between the server agent 210 and the client agent 230. In some embodiments, such virtual channels may be dedicated to specific content types or purposes. For example, a first high-priority virtual channel may be dedicated to transmission of output data, while a second low-priority virtual channel may be dedicated to transmission of window attribute data, references to application tasks, user content, preferences, etc, discussed in more detail below. In some embodiments, virtual channels may be opened or closed without needing to disestablish or reestablish the transport layer connection over which they communicate.

Now referring to FIG. 3, a screen shot of one illustrative embodiment of a jump list or destination list (aka, J-list or D-list) is depicted. Destination lists provide quick and easy access to common application tasks or content. Destination Lists provide the means to launch a new instance of an application, to pin or unpin an application to the taskbar, and to close the application. A user can access the Jump List by right clicking on an application icon in the Taskbar. FIG. 3 depicts a customized jump list. By default, a Jump List contains a Recent category 301 that is populated automatically for file-based applications through the SHAddToRecentDocs function. This function adds the used "item" (document) to the Shell's 250 list of recently used documents. In addition to updating its list of recent documents, the Shell 250 adds a shortcut to the user's Recent directory. The operating system Taskbar uses that list and Recent directory to populate the list of recent items in the Jump Lists. The Shell 250 does the work automatically on behalf of the application, if the application's file type has a registered handler (this does not have to be the default handler). Anytime a user double-clicks on a file type with a registered handler, before the OS launches the application it automatically calls SHAddToRecentDocs on behalf of the application, which inserts the item in the Recent list and eventually into the Jump List Recent Category. The same automatic behavior occurs when using the OS common file dialog to open files through applications. The OS automatically inserts items into the Jump Lists unless the application specifically removes this functionality. Users also have the option to remove any items from their Jump Lists. By explicitly removing an item from the Jump List, it is inserted it into the Removed item list.

FIG. 4 depicts a screen shot of a Destination List 401 for a word processor 403 on a desktop computing environment. In some embodiments, the skin generated by the shell skin generator 240 may be combined with customization. In some embodiments, the skin generated by the shell skin generator 240 may display the Destination List on a mobile device 102 that may contain customized content of predetermined items 404, 405, 406. FIG. 5 depicts a screenshot of a Destination List 501 for a web browser 503 in a desktop computing environment. D-list 501 has predetermined items 505

Often a user will access remotely hosted applications and other resources from multiple devices. For example, a user may access a remotely hosted resource from a thin client device at a work location, from a desktop or laptop computer from a home location, and/or from a tablet, smartphone, or other mobile device when in other than the work or home location, or even in the work or home location. Aspects described herein provide a consistent user experience across all devices, regardless of the shell in use by each particular device.

Figure 6:
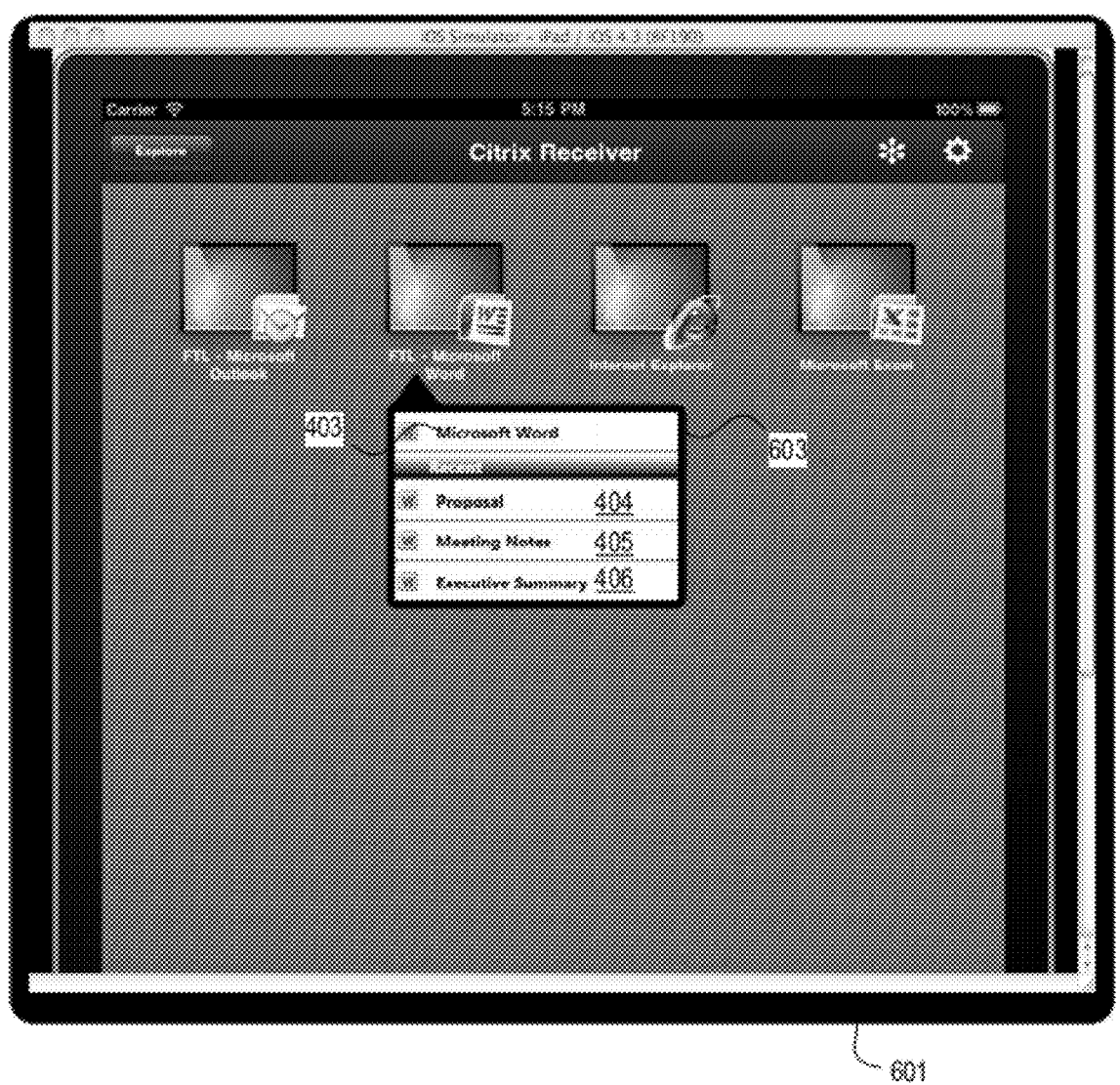
FIG. 6 illustrates va screenshot on a mobile device of a Destination List for a word processor according to one or more aspects described herein.
Figure 7:
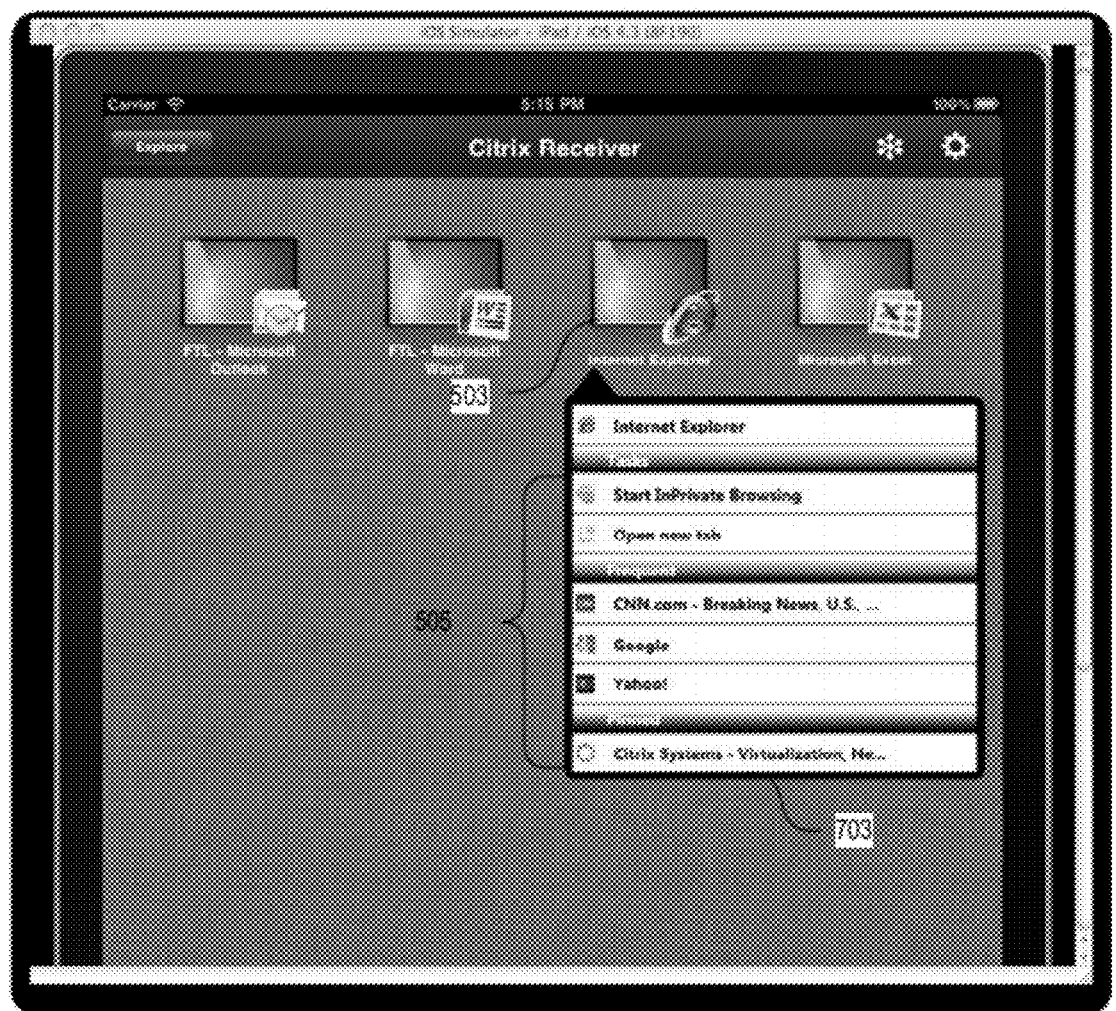
FIG. 7 illustrates a screenshot on a mobile device of a Destination List for a web browser according to one or more aspects described herein.
Figure 8:
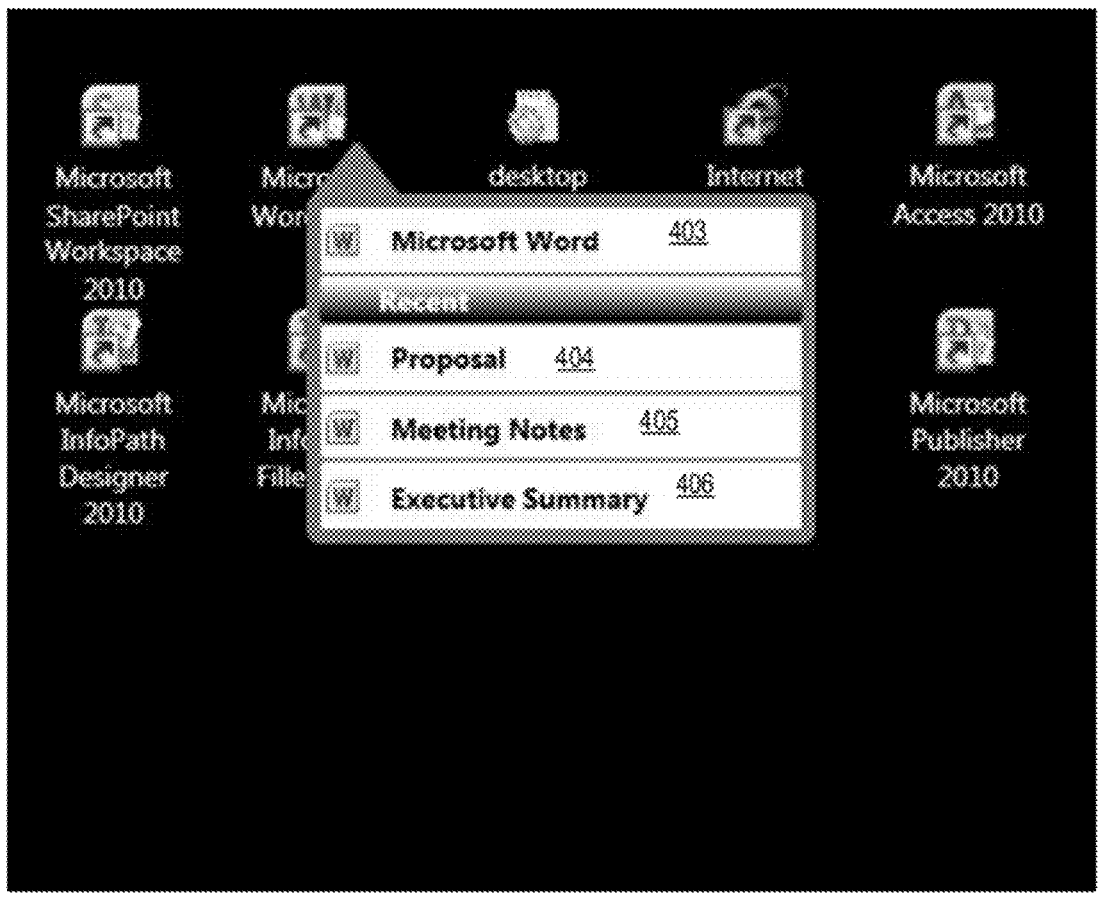
FIG. 8 illustrates a screenshot on a mobile device of a Destination List for a word processor from in-session mobile device shell skin according to one or more aspects described herein.
Figure 9:
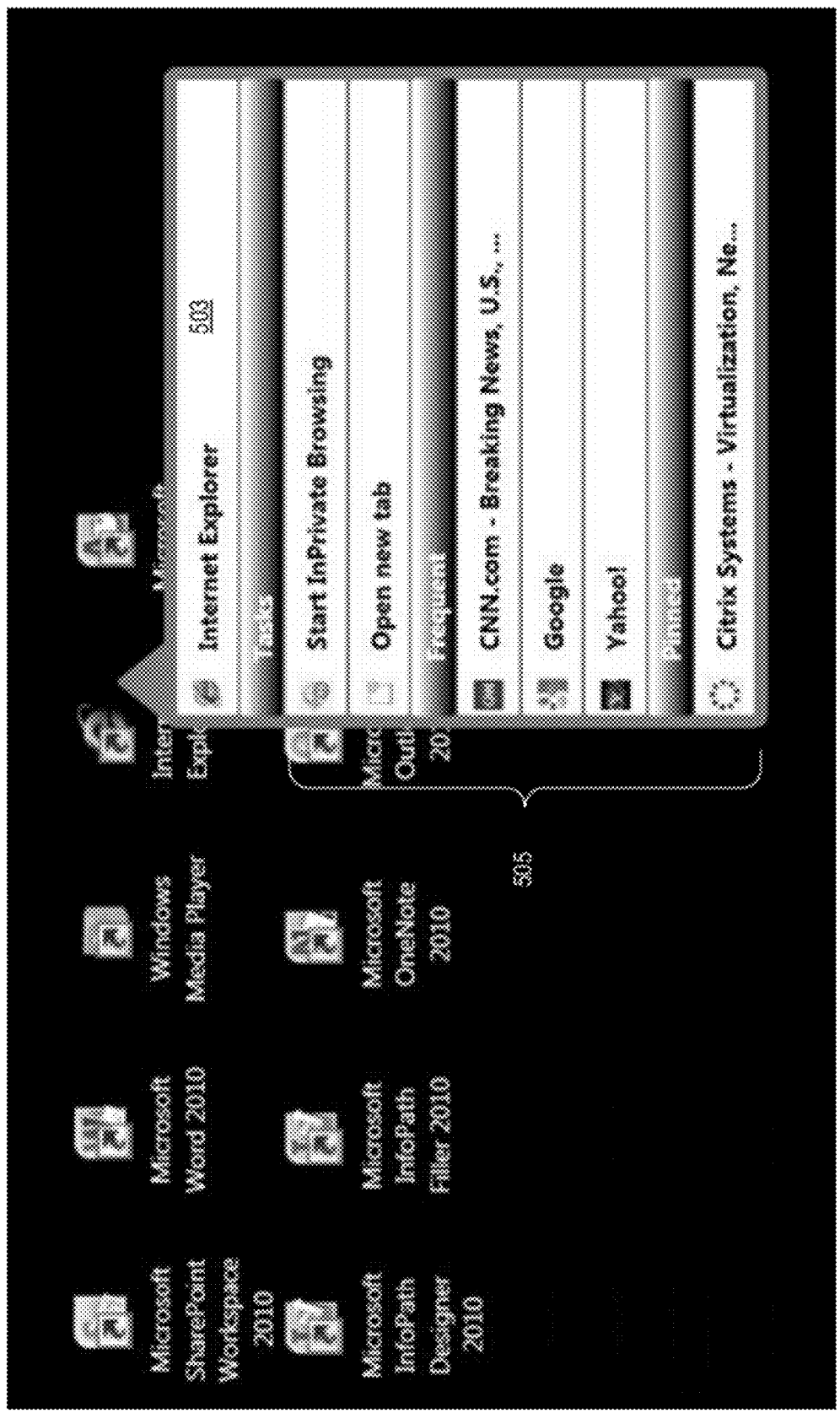
FIG. 9 illustrates a screenshot on a mobile device of a Destination List for a web browser from in-session mobile device shell skin according to one or more aspects described herein.

FIG. 6 depicts a screenshot 601 of a customized Destination List 603 for a word processor 403 presented on a tablet, e.g., an IPAD® brand tablet from Apple Inc., using the look and feel of the native device. D-list 603 may be generated by client software (e.g., a receiver) executing on the native device, and includes customized content of predetermined items 404, 405, 406. FIG. 7 depicts a screenshot 701 of a customized Destination List 703 for a web browser 503 presented on a tablet, using the look and feel of the native device, and having content items 505. FIG. 8 depicts a screenshot of a customized Destination List for a word processor 403 from in-session tablet shell skin, and having content items 404, 405, 406. FIG. 9 depicts a screenshot of a customized Destination List for a web browser 503 from in-session tablet shell skin, and having content items 505 Pinning or unpinning of content or custom tasks can be supported by means of a pre-determined gesture, depending on the end-point device over the Shell Item or Shell Link user interface presentation. Therefore, no additional explicit user interface components may be required.

Figure 12:
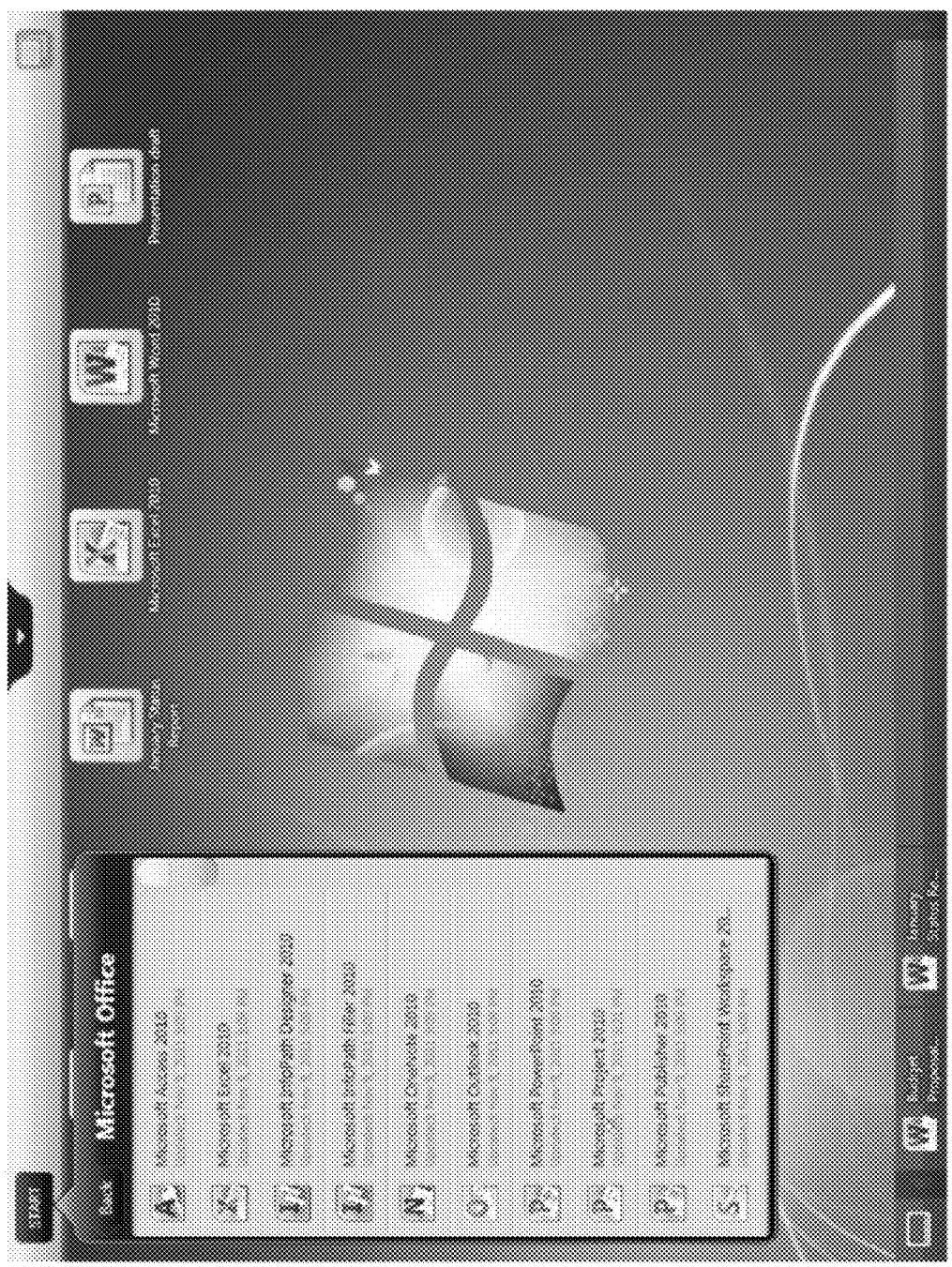
FIG. 12 illustrates a screenshot on a mobile device of another embodiment of tablet-optimized touch-friendly shell skin according to one or more aspects described herein.

FIG. 12 illustrates a screenshot on a mobile device of another embodiment of a tablet-optimized touch-friendly shell skin according to one or more aspects described herein. In particular, the Start Menu (now in the top left) and the Task Bar (at bottom) of a MICROSOFT WINDOWS 7 desktop have been re-skinned and presented in a touch-friendly fashion. In addition, Desktop Shortcuts to favorite documents or applications have been presented with larger touch-friendly icons. The personalized desktop background image has been preserved. As a whole the desktop has been optimized for tablet use.

Figure 10:
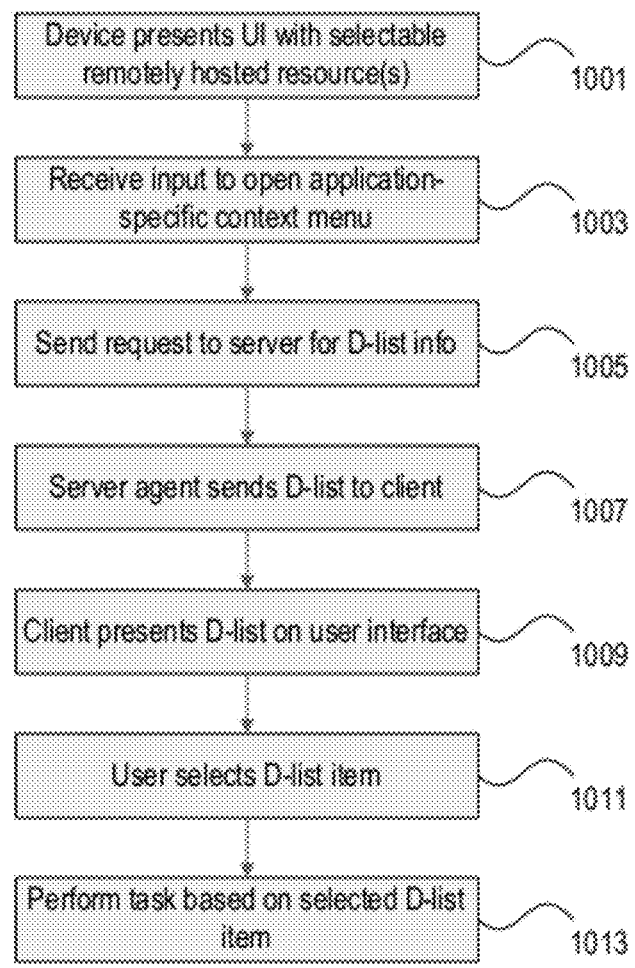
FIG. 10 illustrates a flowchart for a method of performing shell integration according to one or more aspects described herein.

Section C: Methods for Providing Shell Integration for an Application Executing Remotely on a Server According to one or more illustrative aspects, systems and methods described herein may be achieved by decoupling the Destination Lists from the operating system shell and integrating them dynamically with any device, consistent with the device's native look and feel. With reference to FIG. 10, in some embodiments a destination list parser or destination list manager component executing on the server 106 may abstract the management of the internal Destination Lists providing methods to find Destination Lists and read and write to the lists. Parsing is described in additional detail in U.S. application Ser. No. 13/474,238, filed May 17, 2012, entitled "Shell Integration for an Application Executing Remotely on a Server," herein incorporated by reference.

In step 1001, mobile device 102 presents a user interface to a user through which a user can select one or more remotely hosted resources. In some embodiments, the client agent 230 executing on the mobile device 102 enumerates a hosted application 220. In step 1003, a user opens or instructs device 102 to open an application-specific context menu. In some embodiments, a context menu is equivalent to a destination list. In some embodiments, a context menu is the same as a destination list. In some embodiments, a user opens an application-specific context menu using a two-finger tap gesture over an application icon. In some embodiments, a user uses other designated gestures, such as press-and-hold or double-tap, depending on the end-point mobile device 102.

In step 1005, the client agent 230 transmits a request to the server 106 to retrieve the destination list information. In some embodiments, the client agent 230 transmits the request to the server over a remote presentation layer protocol. In some embodiments, the client agent 230 transmits the request over a Citrix NfUse protocol to retrieve the destination list information. In some embodiments, the Destination List information is retrieved in a specific protocol format. In some embodiments, the Destination List information is retrieved during the enumeration of the application 220. In some embodiments, the Destination List information may be cached on the mobile computing device 102.

In some embodiments, an XML relay makes a request with the controller for the application 220. In some embodiments, the controller may be an Independent Management Architecture (IMA) controller. In some embodiments, the controller may be a Desktop Delivery Controller (DDC). In some embodiments, the request is delegated to an IMA worker. In some embodiments, the request is delegated to Virtual Desktop Appliance (VDA) workstation. In some embodiments, the request is delegated to an IMA worker or VDA workstation over Citrix Connection Broker Protocol (CBP), which uses the destination list parser to read destination list information per application into a pre-determined protocol format and return it back to the call chain. In some embodiments, the destination list information can also be cached in an IMA data store or a DDC data schema for each application. In some embodiments, the cache can be updated at runtime.

In step 1007, the client agent 230 receives the destination list information. In some embodiments, client agent 230 receives the d-list information in a pre-determined protocol format. In step 1009 the categories of the application 220 and shell objects are presented opaquely in a d-list using a local user interface. The local user interface can be integrated with the client agent 230. For, example, on iOS (iPad or iPhone client device), a d-list may be managed and presented using a model-view-controller design pattern. NSDictionary or NSMutableDictionary objects may be used to manage the d-list information as associations of keys and values. A UIPopoverController and UITableView may be used to display a hierarchical list of D-list information. Each cell in the table could be UITableViewCell object used to display miscellaneous content, such as images or icons (UIImage), text (UITextField) or labels (UILabel), etc. Target actions and delegate protocol methods can be used to accept user input and trigger a corresponding action on a d-list destination item. In some embodiments, the local user interface can be seamlessly integrated with the native device user interface.

In step 1011, the user clicks or taps on a shell item, such as a document reference, thereby providing user input of a selection of the D-list item to client agent 230. In step 1013, client agent 230 may launch the application 220 with the document reference, or otherwise may perform some other task based on the selected D-list item. In some embodiments, the hosted application 220 launches the document or content directly (e.g. Microsoft Word loading a document). In some embodiments, the user clicks or tabs the shell link (e.g., a task). The client agent 230 launches the application 220 with the task as a command line argument. The hosted application 220 starts by executing the task (e.g. web browser opening a new tab).

Figure 11:
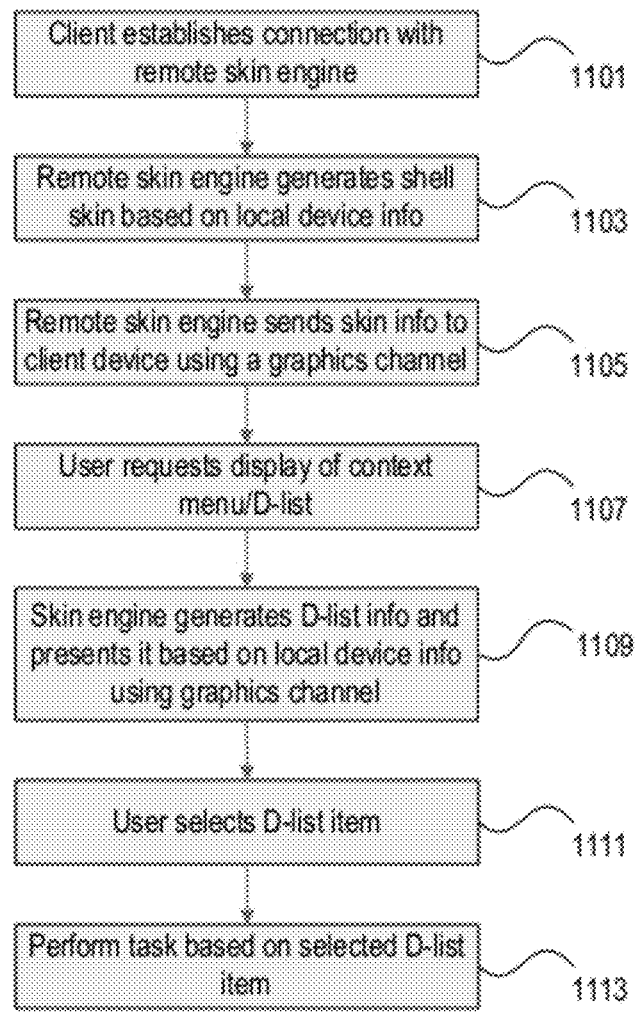
FIG. 11 illustrates a flowchart for a method of performing shell integration according to one or more aspects described herein.

With reference to FIG. 11, in another aspect, a user using a client device may use a local receiver to connect to a remote desktop session to obtain context menu/D-list information. In step 1101, the client agent 230 may establish a connection with the shell skin engine 240. In some embodiments, the client agent 230 instead establishes a connection with the server agent 210, which communicates with the shell skin engine 240. In some embodiments, the connection between the client agent 230 and the shell skin engine 240 is a presentation layer protocol. In step 1103, the shell skin engine 240 may generate a shell skin over the server's 106 shell and in step 1105, may present large application icons, background and resolution consistent with the mobile computing device 102 (such as an iPad, iPhone, or Android). The shell skin may be based on the client device 102. In some embodiments, the skin is selected based on the capabilities of the mobile computing device 102 negotiated over the remote presentation layer protocol. In some embodiments, these capabilities include local device type, operating system major and minor version number, and display resolution. In some embodiments, the shell skin engine 240 generates a default skin to be used for any arbitrary mobile computing device 102. In some embodiments, the shell skin is used to give the illusion of shell replacement on the mobile device 102. In some embodiments, the explorer can be prevented from launching the shell's desktop or taskbar.

In step 1107, the user selects or opens an application-specific context menu, e.g., using a two-finger tap gesture over an application icon. In some embodiments, the user uses other designated gestures to open an application-specific context menu, such as press-and-hold or double-tap, depending on the input capabilities of the mobile computing device 102.

In step 1109, the shell skin engine 240 determines, identifies, and/or generates D-list items based on the user input, e.g., by using the destination list parser to read destination list information for an application 220 into a pre-determined protocol format and opaquely populate with it an in-session popup menu with the application's categories and shell objects. The in-session popup menu with the application's categories and shell objects may be presented with the look and feel of the mobile/client computing device 102.

In step 1111, the user clicks or taps on a shell/D-list item, such as a document reference. In step 1113, the client and/or server takes some action based on the selected item. For example, the shell skin may opaquely launch the document or content with, e.g., a ShellExecute or ShellExecuteEx call. In some embodiments, the already registered file type associations (FTAs) ensure the respective application is launched (e.g. Microsoft Word loads a document).

In some embodiments, the user clicks or taps on a shell link (e.g., a task). The shell skin opaquely launches the application with the task as a command line argument. The hosted application 220 starts by executing the task (e.g. internet browser opens a new tab).

In some embodiments, the shell skin generated by the shell skin engine 240 delegates to the actual Shell 250 the handling of multiple processes, including FTAs, managing recent documents on a per-application and per-user basis by automatically calling SHAddToRecentDocs, updating the destination list files as a result of direct user action or indirect application action. In some embodiments, roaming profiles can be used to preserve application idiosyncrasies of the custom destination lists and the user's preferences and history in the automatic destination list across diverse devices used by the user. In some embodiments, the roaming profiles or mapped network drives or alternative data synchronization solutions can be used to ensure uniform access to file-based content from different thin-client hosts.

With reference to FIG. 12, in some embodiments, the shell skin engine 240 may be implemented as a separate application using C# and/or XAML. The actual Shell 250, e.g., the Microsoft Windows Shell (Explorer), may still execute in the background. The shell skin engine 240 may be presented in front of the default Windows Desktop (in front of the Z-order). Thus the user may be unaware of the existence of the actual Shell 250. Robustly managing the proper Z-order between the actual Shell 250, the shell skin engine 240 and any applications or content windows that may be opened by the user can be achieved by use of window message and/or window procedure hooking, e.g., by using SetWindowHookEx.

In some embodiments the remote resource server may be implemented by leveraging Citrix ShareFile, Microsoft SkyDrive or other Cloud-based storage mechanism.

In some embodiments, the idiosyncrasies of each application are preserved without explicit management by the systems described herein. In some embodiments, they are opaquely handled by the destination list parser, the respective protocol, and the user interfaces. For example, Internet Explorer's Open new tab, Start InPrivate Browsing, Windows Media Player's Play all music, Microsoft Word's Recent document list, any options specific to custom native application, web application or web site are all opaquely parsed, transmitted, and presented in a user interface Pinning and unpinning of applications can also be incorporated and can be made synonymous with selecting or unselecting of applications respectively in the client agent 230. Pinning and unpinning of content or custom tasks from any mobile computing device 102 is also supported by the systems and methods described herein and, in some embodiments, upstream Citrix NfUse protocol is used to update accordingly the per-application and per-user data store. In some embodiments, content does not have to be physically present at the mobile computing device 102, and does not have to be directly accessible by the client agent 230. Instead, in some embodiments, only references and visual elements are presented to the user at the mobile computing device 102, while the actual content used by application 220 resides at server 106 or another remotely accessible data store. In other embodiments, content may be physically present at or directly accessible by the mobile computing device 102 and the client agent 230, e.g., by using mapped network drives or a complementary data synchronization solution.

Using one or more aspects described herein, user specific content is presented consistently as a user accesses a remote resource from multiple different client devices, e.g., from desktop computers, laptop computers, tablet computers, smartphones, etc. For example, while roaming between devices a server may maintain centralized configuration settings for a user, and a shell skin engine at the server may generate information regarding resource icons, orientation of icons, taskbar icons, order of taskbar icons, and destination list items associated with each resource. The server may further generate a skin based on the device from which the user is accessing the content, and send the skin information and user specific content information to device for presentation to the user.

While certain exemplary embodiments have been described and shown in the accompanying drawings, it is to be understood that such embodiments are merely illustrative of and not restrictive on the methods and systems described herein. Additionally, it is possible to implement the methods and systems described herein or some of its features in hardware, programmable devices, firmware, software or a combination thereof. The methods and systems described herein or parts of the methods and systems described herein may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile).

The invention claimed is:

1. A method comprising:
parsing a destination list associated with a resource to generate a platform agnostic destination list;
storing device agnostic preference information at a remote resource server, wherein the device agnostic preference information comprises the platform agnostic destination list;
receiving a request for the preference information from a virtual machine receiver executing on a client device, wherein the request comprises a destination list request based on the resource;
sending the preference information to the virtual machine receiver in a device-agnostic format, wherein the preference information comprises the platform agnostic destination list information for presentation of the destination list information in a user interface format of the client device;
receiving from the client device, modified preference information based on user input received at the client device; and
updating the device agnostic preference information at the remote resource server based on the received modified preference information.

2. The method of claim 1, wherein said preference information further comprises one or more of user-preferences, application options, a list of remote resources, and a presentation order for the list of remote resources for each of the remote resources in the list of remote resources.

3. The method of claim 1, comprising sending the platform agnostic destination list information using a device-independent destination list protocol.

4. The method of claim 1, further comprising:
receiving from a second client device having a different operating system platform from the client device, a second destination list request based on the resource; and
sending the platform agnostic destination list information to a virtual machine receiver executing on the second client device for presentation of the destination list information in a second user interface format based on the second client device, said second format being different from the first format.

5. The method of claim 1, wherein the platform agnostic destination list comprises a plurality of items selected from shell items, shell links, application specific information, user preference information, history information, pinned destinations, frequent destinations, and recent destinations.

6. The method of claim 1, wherein sending the platform agnostic destination list information comprises sending the platform agnostic destination list information responsive to an enumeration of the resource by the client device.

7. One or more non-transitory computer readable media storing computer readable instructions that, when executed, cause a remote resource server to perform:
storing device agnostic preference information at a remote resource server;
generating, at a remotely hosted virtual desktop, a shell skin based on a user interface format associated with a client device;
sending the generated shell skin using a graphics channel over a remote presentation layer protocol to a virtual machine receiver executing on the client device;
receiving a request for the preference information from the virtual machine receiver;
generating the preference information in the user interface format of the client device;
sending the generated preference information to the client device using the graphics channel over the remote presentation layer protocol to the virtual machine receiver executing on the client device;
receiving modified preference information from the client device; and
updating the device agnostic preference information at the remote resource server based on the received modified preference information.

8. The computer readable media of claim 7, wherein said preference information comprises user-preferences, application options, a list of remote resources, a presentation order for the list of remote resources, and destination list information for each of the remote resources in the list of remote resources.

9. The computer readable media of claim 7, further comprising:
parsing a destination list associated with a resource to generate a platform agnostic destination list;
storing the platform agnostic destination list information at the remote resource server location;
receiving from the client device a destination list request based on the resource;
generating the destination list information in the user interface format of the client device; and
sending the generated destination list information to the client device using the graphics channel over the remote presentation layer protocol to the virtual machine receiver executing on the client device.

10. The computer readable media of claim 7, wherein the platform agnostic destination list comprises a plurality of items selected from shell items, shell links, application specific information, user preference information, history information, pinned destinations, frequent destinations, and recent destinations.

11. The computer readable media of claim 9, further comprising:
receiving from a second client device having a different operating system platform from the client device, a second destination list request based on the resource; and
generating the destination list information in a user interface format of the second client device; and
sending the generated destination list information to the second client device using the graphics channel over the remote presentation layer protocol to a virtual machine receiver executing on the second client device, wherein the user interface format of the client device is different from the user interface format of the second client device.

12. The computer readable media of claim 9, wherein receiving from the client device comprises receiving the destination list request over a remote presentation layer protocol.

13. The computer readable media of claim 9, wherein sending the generated destination list information is responsive to an enumeration of the resource initiated from the client device.

14. A method comprising:
storing device agnostic preference information at a remote resource server;
generating, at a remotely hosted virtual desktop, a shell skin based on a user interface format associated with a client device;
sending the generated shell skin using a graphics channel over a remote presentation layer protocol to a virtual machine receiver executing on the client device;
receiving a request for the preference information from the virtual machine receiver;

generating the preference information in the user interface format of the client device;

sending the generated preference information to the client device using the graphics channel over the remote presentation layer protocol to the virtual machine receiver executing on the client device;

receiving modified preference information from the client device; and updating the device agnostic preference information at the remote resource server based on the received modified preference information.

15. The method of claim 14, wherein said preference information comprises user-preferences, application options, a list of remote resources, a presentation order for the list of remote resources, and destination list information for each of the remote resources in the list of remote resources.

16. The method of claim 14, further comprising:
parsing a destination list associated with a resource to generate a platform agnostic destination list;
storing the platform agnostic destination list information at the remote resource server location;
receiving from the client device a destination list request based on the resource;
generating the destination list information in the user interface format of the client device; and
sending the generated destination list information to the client device using the graphics channel over the remote presentation layer protocol to the virtual machine receiver executing on the client device.

17. The method of claim 16, wherein the platform agnostic destination list comprises a plurality of items selected from shell items, shell links, application specific information, user preference information, history information, pinned destinations, frequent destinations, and recent destinations.

18. The method of claim 16, further comprising:
receiving from a second client device having a different operating system platform from the client device, a second destination list request based on the resource; and
generating the destination list information in a user interface format of the second client device; and
sending the generated destination list information to the second client device using the graphics channel over the remote presentation layer protocol to a virtual machine receiver executing on the second client device,
wherein the user interface format of the client device is different from the user interface format of the second client device.

19. The method of claim 16, wherein receiving from the client device comprises receiving the destination list request over a remote presentation layer protocol.

20. The method of claim 16, wherein sending the generated destination list information is responsive to an enumeration of the resource initiated from the client device.

* * * * *